(12) United States Patent
Lyubomirsky et al.

(10) Patent No.: US 9,197,456 B2
(45) Date of Patent: Nov. 24, 2015

(54) BLIND EQUALIZATION TAP COEFFICIENT ADAPTATION IN OPTICAL SYSTEMS

(71) Applicant: FINISAR CORPORATION, Sunnyvale, CA (US)

(72) Inventors: Ilya Lyubomirsky, Pleasanton, CA (US); Jonathan Paul King, San Francisco, CA (US)

(73) Assignee: FINISAR CORPORATION, Sunnyvale, CA (US)

(*) Notice: Subject to any disclaimer, the term of this patent is extended or adjusted under 35 U.S.C. 154(b) by 0 days.

(21) Appl. No.: 14/527,206

(22) Filed: Oct. 29, 2014

(65) Prior Publication Data
US 2015/0117511 A1   Apr. 30, 2015

Related U.S. Application Data

(60) Provisional application No. 61/897,747, filed on Oct. 30, 2013.

(51) Int. Cl.
*H03H 7/40* (2006.01)
*H04L 25/03* (2006.01)

(52) U.S. Cl.
CPC ...... *H04L 25/03057* (2013.01); *H04L 25/0305* (2013.01); *H04L 25/03885* (2013.01)

(58) Field of Classification Search
CPC ................. H04L 25/03057; H04L 25/03038; H04L 25/03019; H04L 25/03133; H04L 2025/0349; H04L 25/03044; H04L 2025/03509; H04L 27/01
USPC .................................................. 375/229–236
See application file for complete search history.

(56) References Cited

U.S. PATENT DOCUMENTS 8,611,403 B1 * 12/2013 Ding .............................. 375/219
2013/0128946 A1 * 5/2013 Gardner et al. ............... 375/233

* cited by examiner

*Primary Examiner* — Dac Ha
*Assistant Examiner* — Janice Tieu
(74) *Attorney, Agent, or Firm* — Maschoff Brennan (57) ABSTRACT

A method of blind tap coefficient adaptation includes receiving a digital data signal including random digital data, equalizing a first portion of the digital data signal using a first set of predetermined tap coefficients and a second portion of the digital data signal using a second set of predetermined tap coefficients. The method includes generating a first eye diagram and a second eye diagram from a first portion and a second portion of an equalized signal, respectively. The first eye diagram is compared with the second eye diagram to determine which of the sets of predetermined tap coefficients results in a data signal having a higher signal quality. The method includes inputting to an equalizer as an initial set of tap coefficients the first set of predetermined tap coefficients or the second set of predetermined tap coefficients according to the determination.

20 Claims, 6 Drawing Sheets

BLIND EQUALIZATION TAP COEFFICIENT ADAPTATION IN OPTICAL SYSTEMS

RELATED APPLICATION

This application claims priority to and the benefit of U.S. Provisional Application No. 61/897,747, which is incorporated herein by reference in its entirety.

FIELD

The embodiments discussed herein are related to equalizer tap coefficient adaptation. In particular, some embodiments are related to equalizer tap coefficient adaptation using a combination of an eye opening monitor and an equalization implementing a decision-directed least mean square (DD-LMS) algorithm.

SUMMARY

This Summary is provided to introduce a selection of concepts in a simplified form that are further described below. This Summary is not intended to identify key features of the claimed subject matter, nor is it intended to be used as an aid in determining the scope of the claimed subject matter.

An example embodiment includes a method of blind tap coefficient adaptation in an optical system. The method may include receiving a digital data signal including random digital data. The method may include equalizing a first portion of the digital data signal using a first set of predetermined tap coefficients. The method may include generating a first eye diagram from a first portion of an equalized signal output from an equalizer. The method may include equalizing a second portion of the digital data signal using a second set of predetermined tap coefficients. The method may include generating a second eye diagram from a second portion of an equalized signal output from the equalizer. The method may include comparing the first eye diagram with the second eye diagram. The method may include determining based on the comparison which of the first set of predetermined tap coefficients or the second set of predetermined tap coefficients results in a data signal having a higher signal quality. The method may include inputting to the equalizer as an initial set of tap coefficients, the first set of predetermined tap coefficients or the second set of predetermined tap coefficients according to the determination.

Another example embodiment includes receiver assembly. The receiver assembly is configured for blind adaptation of equalizer tap coefficients (tap coefficients). The receiver assembly includes a library, an equalizer, and an eye opening monitor (EOM). One or more sets of predetermined tap coefficients may be at least temporarily stored in the library. The equalizer is configured to read a first set of predetermined tap coefficients and a second set of predetermined tap coefficients from the library, to equalize a first portion of received digital data using the first set of predetermined tap coefficients, to equalize a second portion of received digital data using the second set of predetermined tap coefficients, and to output an equalized signal. The EOM is configured to receive the equalized signal from the equalizer; to generate eye diagrams based on a first portion of the equalized signal and a second portion of the equalized signal, to determine based on comparisons of the eye diagrams which of the first and second sets of the predetermined tap coefficients results in a data signal having a higher signal quality, and to communicate a signal indicating which of the first or the second set of tap coefficients results in a data signal having a higher signal quality.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BACKGROUND

An equalizer in an optical system may be configured to implement feed-forward equalization (FFE) and/or decision feedback equalization (DFE). An equalizer including both FFE and DFE may be referred to as an FFE-DFE equalizer. The FFE-DFE equalizer may further implement a least mean square (LMS) algorithm for adapting the equalizer to the channel to equalize digital data signals communicated in the optical system. Specifically, the FFE-DFE equalizer may correct inter-symbol interference (ISI) in the electrical signals such as ISI resulting from multimode dispersion in multimode fibers.

The LMS algorithm may operate by iteratively implementing and evaluating equalization tap coefficients (tap coefficients) until an optimum set of tap coefficients is discovered. The optimization of the tap coefficients may be based on a transfer function. The LMS algorithm may self-adjust the transfer function based on a gradient of mean square error between a desired signal and the actual signal output by the FFE-DFE equalizer. In the optical system, the FFE-DFE equalizer may continuously update the tap coefficients based on received digital data signals to adapt for time varying channels.

An eye diagram may represent a digital data signal. In an optical system the eye diagram may be generated from a digital data signal communicated from an optical receiver. The eye diagram may be generated by repetitively sampling the digital data signal and plotting the sampled digital data on monitoring equipment such as an oscilloscope. The eye diagram may provide information of the digital data signal and the optical system such as channel noise, inter-symbol interference (ISI), performance of a transmitter, or some combination thereof within a particular signaling interval. Opening the eye generally refers to improving the eye diagram, which may occur through changing tap coefficients in an equalizer. An eye opening monitor (EOM) generally refers to a device or circuit that receives a digital data signal and analyzes signal quality based on the eye diagram or an approximation of an eye diagram as implemented by EOM circuitry.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

In optical systems, multiple types of signal equalization may be implemented. In some types of signal equalization, equalization of a digital data signal may include adaptation of equalization tap coefficients (tap coefficients) used in an equalizer. As used herein, the term "adaptation" generally includes determining and re-determining a set of tap coefficients in the equalizer to improve a received digital data signal and performance of the optical system.

An example type of equalization includes feed-forward equalization (FFE) and decision feedback equalization (DFE) (collectively, FFE-DFE). In FFE-DFE a decision-directed least means square (DD-LMS) algorithm may be implemented. DD-LMS algorithms compare signals processed by the FFE-DFE resulting from previously determined tap coefficients to the decisions made at an output of a clock and data recovery circuit (CDR). The output of the CDR is assumed to be correct to get an estimate of an error between the output of the CDR and signals processed by the FFE-DFE resulting from the previously determined tap coefficients. The error, or a gradient of the error, drives adaptation of the tap coefficients.

However, the FFE-DFE equalizer may operate more effectively when an overall quality of the signal is already above a quality threshold. For example, when the signal includes a high bit error rate (BER), the FFE-DFE equalizer may not converge on an effective set of tap coefficients because the reliability of the DD-LMS error estimate may suffer due to decision errors in the CDR. Accordingly, the DD-LMS adaptation of an FFE-DFE equalizer may not operate effectively during an initial start-up of an optical system when the received eye may be effectively closed due to inter-symbol interference (ISI).

A training sequence may be used to compensate for this limitation of the DD-LMS adaptation scheme of the FFE-DFE equalizer. When initially determining the tap coefficients, the training sequence may be transmitted to the FFE-DFE equalizer. The training sequence may include a known sequence of digital data, which may be used to determine an initial set of tap coefficients. However, because the training sequence is being transmitted rather than normal data, the training sequence wastes resources of the optical system.

Another type of signal equalization includes use of an eye opening monitor (EOM). The EOM may estimate the quality of a signal based on an eye diagram of the signal, some approximation of an eye diagram, an estimate of eye opening, or some combination thereof. Based on the estimated quality of the signal, the EOM may determine tap coefficients of an equalizer. However, the EOM operates based on a relatively long series of digital data. Thus, the EOM may have to wait for the series of digital data before a reliable estimate of an eye diagram may be generated. Thus adaptation based on the EOM may be slow compared to the DD-LMS adaptation in the FFE-DFE equalizer.

Accordingly, an example embodiment discussed herein includes an optical system in which the adaptation of the tap coefficients is performed using an EOM and an FFE-DFE equalizer. The optical system also includes a memory in which known sets of tap coefficients are stored. The known sets of tap coefficients may be experimentally determined for specific characteristics of the optical system and/or may be determined from computer simulations.

Initially, for example, during start-up of the optical system, normal digital data is transmitted to the FFE-DFE equalizer. The known sets of tap coefficients are input to the FFE-DFE equalizer. EOM eye diagrams based on the data equalized using the known sets of tap coefficients are generated and compared to determine which of the known sets of tap coefficients result in a data signal having a highest quality. The known set of tap coefficients that results in the best eye diagram are input as an initial set of tap coefficients. At this point, the eye may be sufficiently open for reliable operation of the DD-LMS algorithm. The FFE-DFE equalizer continues adaptation of the tap coefficients using a DD-LMS algorithm. Operation of the EOM may then be ceased. This and other embodiments are described herein with reference to the accompanying drawings.

Figure 1:
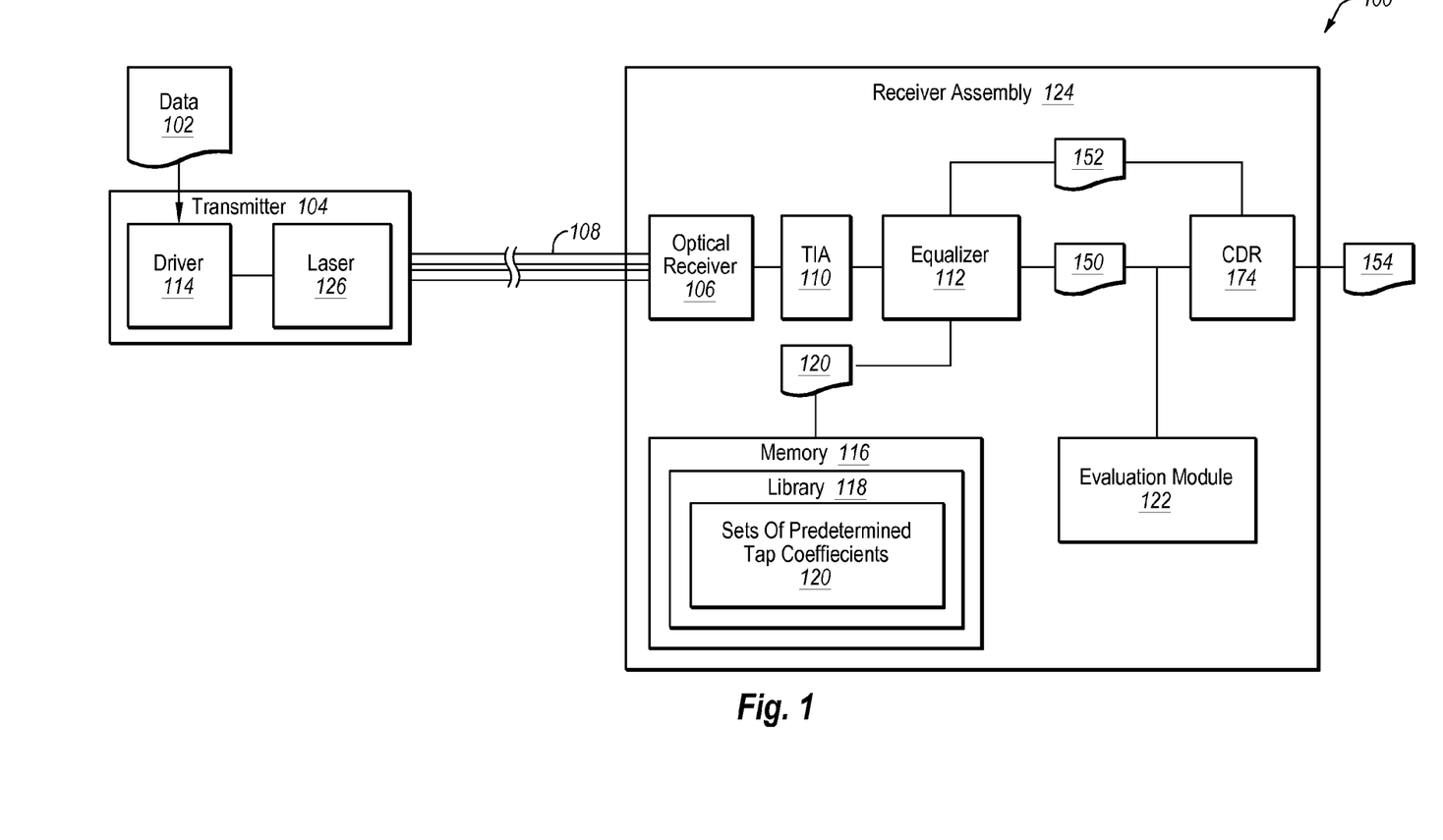
FIG. 1 illustrates a block diagram of an example optical system, in which some embodiments may be implemented.

FIG. 1 illustrates a block diagram of an example optical system 100 in which some embodiments described herein may be implemented. The optical system 100 may be configured for blind adaptation of tap coefficients. As used herein, blind adaptation may indicate that the optical system 100 is configured for adaptation of equalizer tap coefficients without transmission of a training sequence. Some embodiments of the optical system 100 may be a multi-mode optical system such as an optical system substantially conforming to the 100GBASE-SR4 standard or another suitable Ethernet data communication standard. In these embodiments, the optical system 100 may include a multi-mode fiber (MMF) that substantially conforms to the OM3 standard, for instance.

Some potential benefits of blind adaptation may include an increase in the rate of adaptation of the tap coefficients when compared to optical systems using a training sequence. For example, the optical system 100 may not waste the time involved in communicating the training sequences. Additionally, in systems that use training sequences, a hand-shaking protocol between a receiver and a transmitter may be implemented when a training mode is completed. The hand-shaking protocol may be implemented before the receiver switches operation to a normal mode and the transmitter begins transmitting data (e.g., data 102). The hand-shaking protocol may expend time and may involve some dedicated circuitry. The optical system 100 may omit such circuitry and may not expend time performing the hand-shaking protocol. Additionally or alternatively, systems using the training sequences may include circuitry at the transmitter that is dedicated at least partially to generation of training sequences. The optical system 100 may omit such circuitry.

In the embodiment depicted in FIG. 1, the optical system 100 is configured to communicate digital data 102 in the form of optical signals from a transmitter 104 to a receiver assembly 124 via an MMF 108. The transmitter 104 may include a laser 126 or another suitable optical signal source. The laser 126 may include a vertical cavity surface-emitting laser (VCSEL) or a directly modulated laser (DML), for instance. The transmitter 104 may also include a driver 114 that is configured to drive the laser 126.

The digital data 102 may include non-return to zero (NRZ) data, for instance. The NRZ data may be configured to be communicated at a symbol rate of 25.8 gigabaud per second (Gb/s) or other suitable symbol rate. The digital data 102 may be representative of some occurrence or state, and accordingly the digital data 102 may be random.

The receiver assembly 124 may include an optical receiver 106, a transimpedence amplifier (TIA) 110, an equalizer 112, a CDR 174, a memory 116, and an evaluation module 122. The optical receiver 106 may convert the optical signals communicated along the MMF 108 to electrical signals representative of the optical signals. The optical receiver 106 may include a photodiode, for example. The TIA 110 may receive the electrical signals from the optical receiver 106 and may be configured to amplify the electrical signals. The electrical signals may then be communicated to the equalizer 112, which may be configured to equalize the electrical signals. Equalized signals 150 may then be communicated from the equalizer 112 to the CDR 174. The equalized signals 150 may include one or more portions, which may be based on portions of an optical signal received by the optical receiver 106. The CDR 174 may provide a feedback signal 152 to the equalizer 112 and may further communicate a data signal 154 indicative of the digital data 102 to a host device (not shown) implementing or including the receiver assembly 124.

The equalizer 112 may be configured for equalization of the electrical signals output from the TIA 110. Additionally, the equalizer 112 may be configured for adaptation of tap coefficients during communication of the digital data 102 in the optical system 100. The equalizer 112 may include an FFE-DFE equalizer. In embodiments in which the equalizer 112 includes the FFE-DFE equalizer, the equalizer 112 may implement a DD-LMS algorithm.

The equalizer 112 may be communicatively coupled to the memory 116. For example, the equalizer 112 may be configured to receive information and data stored at least temporarily in the memory 116. Additionally, the equalizer 112 may communicate information and data to the memory 116 for storage thereon.

The memory 116 may be a DRAM device, an SRAM device, flash memory, or some other memory device. In some embodiments, the memory 132 also includes a non-volatile memory or similar permanent storage device for storing information on a more permanent basis. The memory 116 may be an example of a non-transitory computer-readable medium such as RAM, ROM, EEPROM, flash memory, or other memory technology, or any other non-transitory computer-readable medium. The memory 116 may include a library 118. Portions of the memory 116 other than the library 118 may be allocated for other purposes such as storage of instructions and or data that may be implemented by one or more processors. These instructions may be executed to perform one or more techniques described herein.

The library 118 may be configured to store one or more sets of predetermined tap coefficients 120. The sets of predetermined tap coefficients 120 may be an example of data or information communicated to the equalizer 112 as depicted in FIG. 1. The sets of predetermined tap coefficients 120 may include one or more tap coefficients that are experimentally determined for one or more implementations, channel types, and/or characteristics of the optical system 100. For example, the sets of predetermined tap coefficients 120 may be determined for implementations in which the MMF 108 includes lengths of about 100 meters (m), about 200 m, about 300 m, etc. Additionally or alternatively, the sets of predetermined tap coefficients 120 may be determined for an embodiment of the optical system 100 including specific types of the MMF 108, the transmitter 104, the laser 126, the receiver assembly 124, the optical receiver 106, other components of the optical system 100, or any combination thereof.

The evaluation module 122 may be configured to receive the equalized signals 150 communicated from the equalizer 112. The evaluation module 122 may determine signal quality of the equalized signals 150. Based on the determined signal quality, the evaluation module 122 may determine an initial set of tap coefficients to be implemented in the equalizer 112 from the sets of predetermined tap coefficients 120.

The evaluation module 122 may include an EOM or any other suitable system configured to receive the equalized signals 150 or another signal indicative of signal quality and evaluate signal quality based thereon. For example, in some embodiments, the evaluation module 122 may include an EOM. The EOM may generate eye diagrams or approximate metrics of an eye quality from the equalized signals 150. Additionally, the EOM may be configured to compare multiple eye diagrams generated from multiple sets of equalized signals received from the equalizer 112.

In some embodiments, the evaluation module 122 may generate a derived signal-to-noise ratio. The derived signal-to-noise ratio may be based on statistical analysis of the equalized signals 150. In some embodiments, the evaluation module 122 may include a pseudo error monitor, an actual received error rate monitor, which may receive an indication of actual errors from a downstream system. In some embodiments, the evaluation module 122 may perform a statistical analysis of an unretimed signal waveform.

Figure 2:
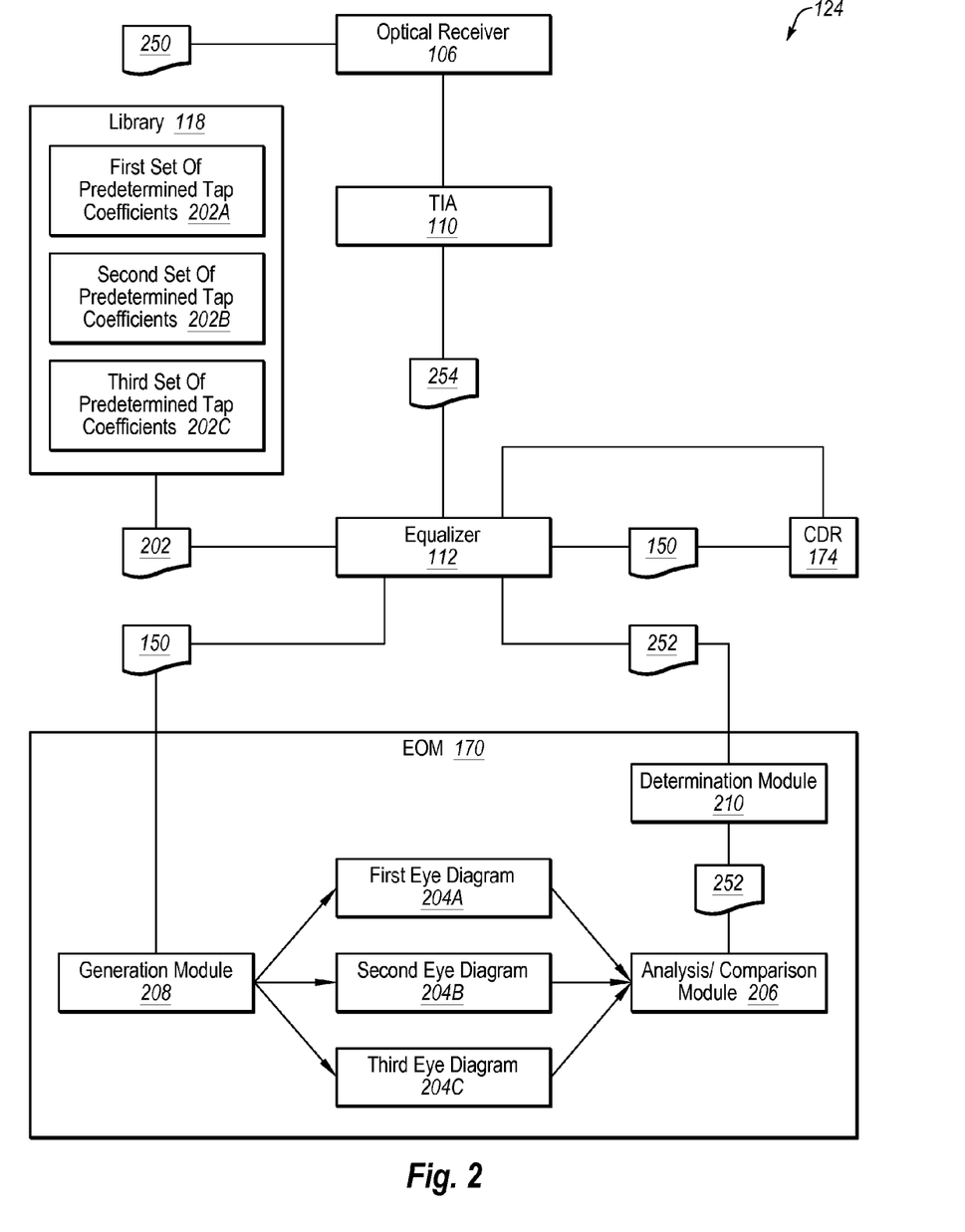
FIG. 2 illustrates a block diagram of an example receiver assembly that may be implemented in the optical system of FIG. 1.

FIG. 2 illustrates a block diagram of an example embodiment of the receiver assembly 124. In the receiver assembly 124, an initial set of tap coefficients may be determined for the equalizer 112. The receiver assembly 124 may be included in the optical system 100 of FIG. 1 or in other optical systems implementing the equalizer 112.

The receiver assembly 124 includes the library 118, the equalizer 112, the TIA 110, and the optical receiver 106 that are described with reference to FIG. 1. Some details of these components are not repeated with reference to FIG. 2. In embodiment of FIG. 2, the receiver assembly 124 includes an EOM 170 as an example evaluation module (e.g., 122 of FIG. 1). While determining an initial set of tap coefficients as depicted in FIG. 2 is described when the evaluation module includes the EOM 170, a similar determination may be implemented in systems in which the evaluation module 122 includes another system.

In FIG. 2 the library 118 is depicted including sets of predetermined tap coefficients 202A-202C (generally, set or sets of predetermined tap coefficients 202). Each of the sets of predetermined tap coefficients 202 may generally correspond to and/or be substantially similar to the sets of predetermined tap coefficients 120 of FIG. 1.

During start-up or another time in which the equalizer 112 may receive an initial set of tap coefficients, an optical signal 250 may be transmitted to the optical receiver 106. For example, the optical signal 250 may be communicated via the MMF 108 of FIG. 1. As described above, the optical receiver 106 may then communicate an electrical signal (not shown) representative of the optical signal 250 to the TIA 110, which may be communicated an amplified representation of the electrical signal (not shown) to the equalizer 112. The optical signal 250, and thus the electrical signals, includes normal (e.g., random) data such as the digital data 102 of FIG. 1. Specifically, in some embodiments, the optical signal 250 does not include a training sequence or any other known sequence of digital data. A term "received signal 254" is used with reference to FIG. 2 to refer to the electrical signal received by the equalizer 112.

A first set of predetermined tap coefficients 202A may be communicated to the equalizer 112 from the library 118. The communication of the first set of predetermined tap coefficients 202A may be performed by the equalizer 112. For example, the equalizer 112 may read or otherwise access the first set of predetermined tap coefficients 202A from the library 118. Alternatively, another system or possessor may write the first set of predetermined tap coefficients 202A to the equalizer 112.

The first set of predetermined tap coefficients 202A may then be used by the equalizer 112 to equalize a first portion of the received signal 254, which may result in a first portion of the equalized signals 150. The first portion of the equalized signals 150 exit may the equalizer 112 and may be communicated to the CDR 174 and the EOM 170.

The EOM 170 may include a generation module 208. The generation module 208 may be configured to generate eye diagrams 204A-204C (generally, eye diagram 204 or eye diagrams 204) from the equalized signals 150. The EOM 170 may receive the first portion of the equalized signals 150 and generate a first eye diagram 204A based on the first portion of the equalized signals 150.

A second set of predetermined tap coefficients may then be communicated to the equalizer 112. The equalizer 112 may use a second set of predetermined tap coefficients 202B to equalize a second portion of the received signal 254 communicated from the TIA 110. A second portion of the equalized signals 150 may then be communicated to the CDR 174 and the EOM 170. The generation module 208 may generate a second eye diagram 204B from the second portion of the equalized signals 150. Likewise, a third set of predetermined tap coefficients 202C may be communicated to the equalizer 112. The equalizer 112 may use the third set of predetermined tap coefficients 202C to equalize a third portion of the received signal 254 communicated from the TIA 110. A third portion of the equalized signals 150 may then be communicated to the CDR 174 and the EOM 170. The generation module 208 may generate a third eye diagram 204C from the third portion of the equalized signals 150.

The EOM 170 may also include an analysis/comparison module 206. The analysis/comparison module 206 may receive as input the eye diagrams 204 and may analyze and/or compare the eye diagrams 204. Generally, the eye diagrams 204 may be indicative of quality of a data signal that may be communicated to a host device. The analysis/comparison module 206 may generate a best coefficient signal 252 indicating which of the sets of predetermined tap coefficients 202 results in a best eye diagram. The characterization of the best and/or an assessment or evaluation of signal quality may, in some embodiments, be based on one or more eye diagram metrics such as a vertical eye opening, a horizontal eye opening, a number of hits within an eye mask, or some combination thereof.

The EOM 170 may include a determination module 210. The determination module 210 may receive the best coefficient signal 252 from the analysis/comparison module 206. The determination module 210 may then communicate the best coefficient signal 252 to the equalizer 112. In some embodiments, the determination module 210 may be omitted, and the best coefficient signal 252 may be communicated directly to the equalizer 112 from the analysis/comparison module 206.

The equalizer 112 may then load the set of predetermined tap coefficients 202 that results in the best eye diagram as an initial set of tap coefficients. The equalizer 112 may then continue to operate using a normal operational algorithm, such as the DD-LMS algorithm. Using the normal operational algorithm, adaptation of the tap coefficients may continue until convergence on an optimal set of tap coefficients occurs. Some models seem to indicate that using the combination of the EOM 170 and the equalizer 112, convergence of the tap coefficients may occur in about 1000 bit periods. Additionally, after the set of predetermined tap coefficients 202 that results in the best eye diagram is loaded as an initial set of tap coefficients, operation of the EOM 170 may be ceased.

The embodiment depicted in FIG. 2 includes three sets of predetermined tap coefficients 202 that result in three eye diagrams 204. In some alternative embodiments, the process 200 may include more than or fewer than three sets of predetermined tap coefficients 202, which may result in more than or fewer than three eye diagrams 204. Additionally, in the embodiment depicted in FIG. 2, the library 118 is separate from the EOM 170, the equalizer 112, and the eye diagrams 204 generated in the EOM 170. In some alternative embodiments, the eye diagrams 204 may be stored in a common memory with the sets of predetermined tap coefficients 202. Moreover, the library 118, the equalizer 112, the EOM 170, or any portion or component thereof may be included in a single component or be further separated into one or more additional components.

In some embodiments, the receiver assembly 124 of FIG. 2 may include another type of evaluation module. The evaluation module may be configured to determine the best coefficient signal 252 based a metric indicative of signal quality. For example, in these embodiments, the analysis/comparison module 206 may base such a determination on a derived signal-to-noise ratio, pseudo error, actual received error, statistical analysis of unretimed signal waveforms, etc.

Figure 3:
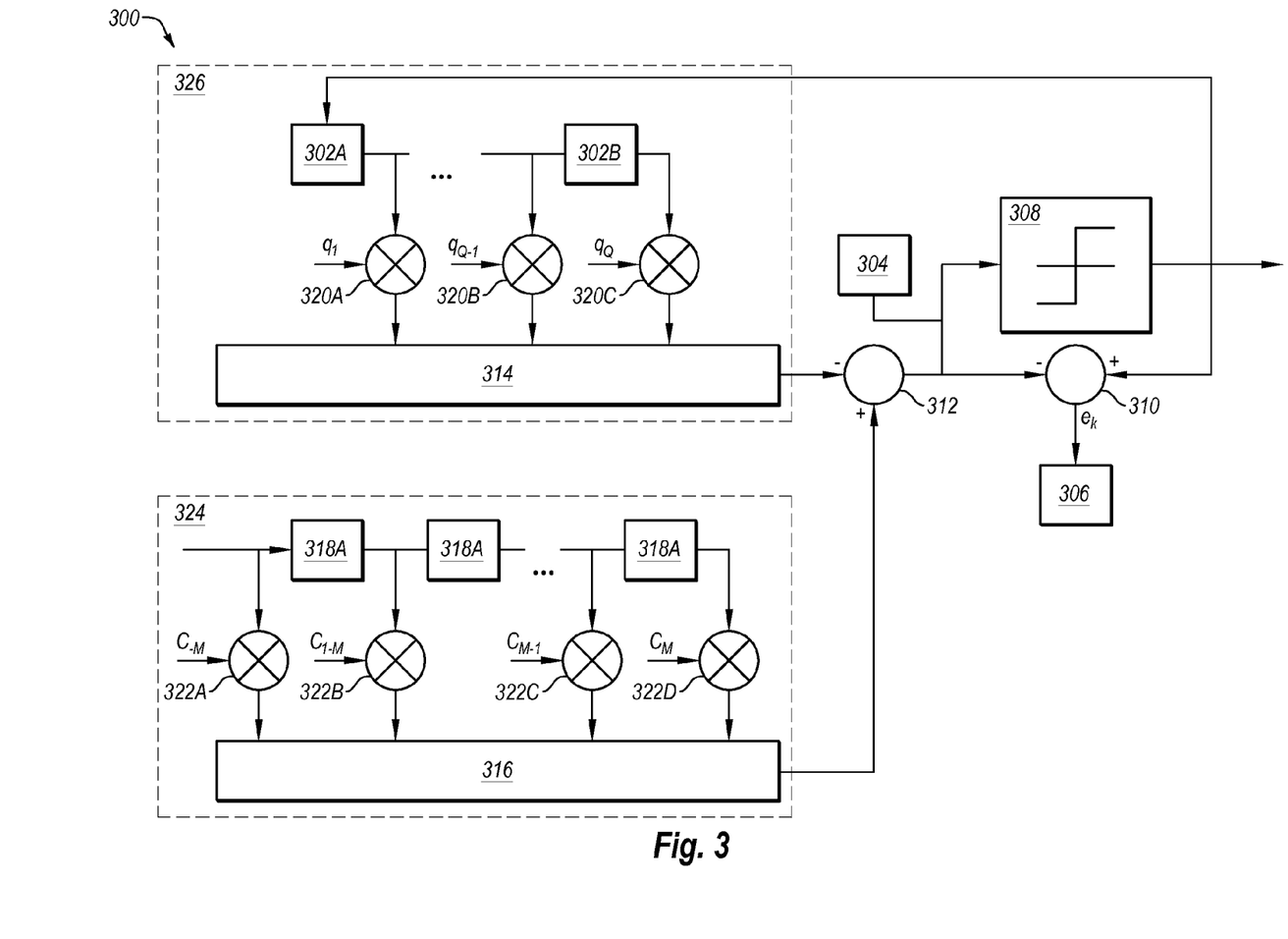
FIG. 3 illustrates a block diagram of an example equalizer circuit that may be implemented in the optical system of FIG. 1.

FIG. 3 illustrates a block diagram of an example equalizer circuit 300 that may be implemented in the receiver assembly 124 of FIGS. 1 and 2. The equalizer circuit 300 may include an FFE 324 and a DFE 326 (collectively, FFE-DFE 324/326). The FFE-DFE 324/326 is depicted with a slicer 308, an EOM 304, and a DD-LMS module 306. One or more of the FFE-DFE 324/326, the slicer 308, the EOM 304, and the DD-LMS module 306 may be a circuit or circuits realized as on integrated circuits employing Silicon Germanium (SiGe) technology or another suitable integrated circuit material, for example.

Generally, the EOM 304 is substantially similar and may correspond to the EOM 170 discussed with reference to FIGS. 1 and 2. The EOM 304 may be configured to sample and/or monitor signal quality before the signal enters the slicer 308. Likewise the DD-LMS module 306 may be substantially similar to the DD-LMS discussed above with reference to the equalizer 112. Each of the FFE 324 and the DFE 326 is described briefly below.

The FFE 324 may be configured to correct a waveform of a data signal received by the FFE 324 at an input. For example, with combined reference to FIGS. 1 and 3, the FFE 324 may receive a signal from the TIA 110. The FFE 324 may use the voltage levels of the received signal associated with previous and current bits to correct the voltage level of the current bit. Specifically, referring back to FIG. 3, the data signal may be divided into several paths with intervening time delays 318A-318C. Each piece of the data signal may then be involved in a multiplication at one of multiple multiplication stages 322A-322D with corresponding tap coefficients, $C_{-M}$, $C_{1-M}$ ... $C_{M-1}$, and $C_M$.

When multiplied by the separated data signal, the tap coefficients $C_{-M}$, $C_{1-M}$ ... $C_{M-1}$, and $C_M$ produce a series of filtered values at the multiplication stages 322A-322D. The filtered values are summed in an FFE summer 316. The filtered values provide M delays and superimposed weighted signals to a second summer 312. The second summer 312 also receives summed resultant values from the DFE 326 (described below). In general, the FFE 324 obtains an equalized voltage level for a bit of interest by forming a sum at the FFE summer 316 of the products of the tap coefficients $C_{-M}$, $C_{1-M}, \ldots C_{M-1}$, and $C_M$ and voltage levels of the previous $M-1$ delayed bits as well as the bit of interest before being equalized.

The basic approach of the DFE 326 is to subtract out errors included in previously-decided bits. Thus a decision on a current bit is made based on a current signal bit minus interference on one or more (in FIG. 3 Q–1) succeeding or forward-looking bits. Accordingly, the DFE 326 may take final bits of data from the data signal. Specifically, the slicer 308 may be configured to "slice off" bits and delay the bits through one or more time delays 302A-302B. The bits are then communicated to multipliers 320A-320C. Tap coefficients $q_1 \ldots q_{Q-1}$, and $q_Q$ are multiplied by the bits at the multipliers 320A-320C. Resulting values are then summed at a DFE summer 314 and communicated to the second summer 312.

A value exiting the second summer 312 is further communicated to an error stage 310. The error stage 310 receives the value exiting the second summer 312 and a value exiting the slicer 308 to determine an error value ($e_k$). Based on the error value ($e_k$) the DD-LMS adjusts the tap coefficients, $C_{-M}$, $C_{1-M} \ldots C_{M-1}$, and $C_M$ of the FFE 324 and the tap coefficients $q_1 \ldots q_{Q-1}$, and $q_Q$ of the DFE 326. The tap coefficients $C_{-M}$, $C_{1-M} \ldots C_{M-1}$, and $C_M$ are applied at the multiplication stages 322A-322D and the multipliers 320A-320C in successive equalization processes.

In general, the above-described operation of the equalizer circuit 300 may be referred to as normal operation and may correspond to implementation of a normal operational algorithm. The normal operation may be distinct and/or different from operation of the equalizer circuit 300 during initiation or start-up.

Figure 4:
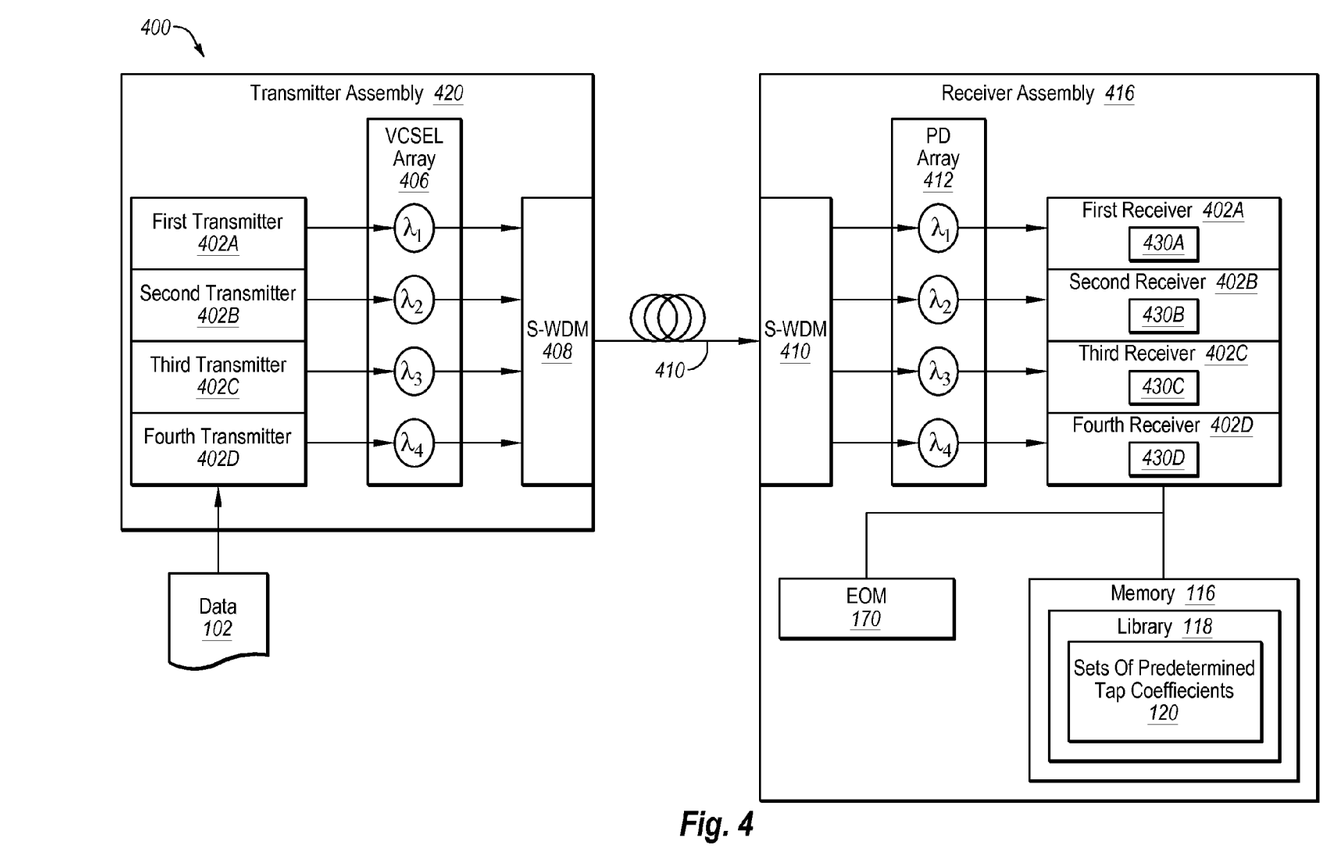
FIG. 4 illustrates a block diagram of another example optical system.

FIG. 4 illustrates a block diagram of another example optical system 400. The optical system 400 may generally include a wavelength-division multiplexing (WDM) optical system. In the optical system 400 two or more optical signals may be communicated between a transmitter assembly 420 and a receiver assembly 416 via a multi-mode fiber (MMF) 414. Each of the optical signals may include a different wavelength.

In FIG. 4, the optical signals having different wavelengths are represented by $\lambda_1$-$\lambda_4$. For example, a first optical signal may be represented by $\lambda_1$. In some embodiments, the wavelengths of the optical signals $\lambda_1$-$\lambda_4$ may be separated by about 30 nanometers (nm) to about 60 nm in a region of about 800 nm to about 1000 nm.

In some embodiments, more than four or fewer than four optical signals may be communicated in the optical system 400. In these and other embodiments, one or more components (e.g., 402, 404, 406, 408, 410, 412, and 414), features of the components, numbers of the components included in the optical system 400, or some combination thereof, may be scaled (e.g., increased or decreased proportionally) for communication of the optical signals.

The optical signals $\lambda_1$-$\lambda_4$ may be generated at the transmitter assembly 420. For example, the optical signals $\lambda_1$-$\lambda_4$ may be generated by transmitters 402A-402D (generally transmitter 402 or transmitters 402) and a component of a VCSEL array 408. In the optical system 400, the VCSEL array 408 may include one VCSEL or another suitable optical source for each of the optical signals $\lambda_1$-$\lambda_4$. For example, a first optical signal $\lambda_1$ may be generated by a first transmitter 402A and a first VCSEL of the VCSEL array 406. The optical signals $\lambda_1$-$\lambda_4$ may be representative of the digital data 102, which may include normal data and not training sequences.

A multiplexer (in FIG. 4, "S-WDM") 408 may receive the optical signals $\lambda_1$-$\lambda_4$ and multiplex the optical signals $\lambda_1$-$\lambda_4$ onto the MMF 414. The MMF 414 may include an OM3 link in some embodiments. The optical signals $\lambda_1$-$\lambda_4$ may then be communicated along the MMF 414 to the receiver assembly 416. The receiver assembly 416 may include a demultiplexer 410. The demultiplexer (in FIG. 4, "S-WDM") 410 may separate the optical signals $\lambda_1$-$\lambda_4$ by wavelength and communicate separated optical signals to a photodiode (PD) array 412.

The PD array 412 may include multiple PDs or other suitable optical receivers (e.g., optical receiver 106 of FIG. 1). In the optical system 400 of FIG. 4, the PD array 412 may include one PD for each of the optical signals $\lambda_1$-$\lambda_4$. The PD array 412 may generate an electrical signal representative of the optical signals of the PD array 412 based on the optical signals $\lambda_1$-$\lambda_4$ and communication of the electrical signals to one of receivers 404A-404D (generally, the receiver 404 or receivers 404). The electrical signals may be equalized in the receivers 404. For example, each of the receivers 404 may include equalizers 430A-430D (generally, equalizer 430 or equalizers 430). One or more of the equalizers 430 may be substantially similar to the equalizers 112 and/or 300 described above.

The receiver assembly 416 may also include the EOM 170, the memory 116, the library 118, and the sets of predetermined tap coefficients 120. The sets of predetermined tap coefficients 120 may include multiple sets of predetermined tap coefficients that are not explicitly depicted in FIG. 4. These sets of predetermined tap coefficients may be substantially similar to the sets of predetermined tap coefficients 202 described above with reference to FIG. 2.

During start-up or during another time in which one or more of the equalizers 430 use an initial set of tap coefficients, the initial set of tap coefficients may be determined as described above with reference to FIG. 2. For example, multiple sets of predetermined tap coefficients 120 may be communicated to each of the equalizers 430 and eye diagrams may be compared to determine a best set of predetermined tap coefficients from those sets communicated to the equalizers 430. Each of the equalizers 430 may then implement the best set predetermined tap coefficients for that equalizer 430 as an initial set of tap coefficients.

However, in some circumstances, a channel included in the optical system 400 (or 100) may include an unacceptable quality. For example, the eye diagrams generated from equalized signals may be closed. Data signals with an unacceptable quality may be due to manufacturing issues in the fiber (MMF 414 or the MMF 108), for instance, that may shift a best response frequency of the fiber. In these and other circumstance, the data signal may have an unacceptable quality despite the sets of predetermined tap coefficients 120 input to the equalizer 430 because none of the sets of predetermined tap coefficients 120 may be sufficient to be input as an initial set of tap coefficients.

Accordingly, in the optical system 400, the tap coefficients from one of the equalizers 430 may be shared with another of the equalizers 430. Specifically, a set of tap coefficients from the equalizer 430 that result in a data signal having an acceptable quality may be communicated to another equalizer 430 that is producing a data signal having an unacceptable quality.

In some embodiments, the EOM 170 or another system or processor may be configured to assess eye diagrams based on equalized signals generated in the equalizers 430. For example, each of the equalizers 430 may read one or more sets of predetermined tap coefficients 120 from the library 118. The equalized signals generated at the equalizers 430 may be the bases of eye diagrams generated by the EOM 170. The EOM 170 may determine which of the sets of predetermined tap coefficients 120 result in data signals having a high quality for one or more of the equalizers 430 and which result in data signals having an unacceptable quality (e.g., a closed eye).

In response to an assessment of a data signal with an unacceptable quality, a set of predetermined tap coefficients 120 implemented as initial tap coefficients or tap coefficients being implemented in one of the equalizers 430 may be communicated to another of the equalizers 430 as an initial set of tap coefficients. The tap coefficients being implemented in one of the equalizers 430 may have been successfully learned in decision directed mode to be optimum for a MMF fiber response at one of the wavelengths of one of the optical signals $\lambda_1$-$\lambda_4$. The tap coefficients learned in the decision directed mode may be more optimum for another of the channels than any of the sets of predetermined tap coefficients 120 in the library 118. Thus, another of the equalizers 430 may receive the tap coefficients as shared information to improve its ability to converge to a good set of tap coefficients. The equalizer(s) 430 may then perform further adaptation of tap coefficients using in normal (e.g., decision directed) operation and the EOM 170 may cease operation after the initial set of tap equalization coefficients are input to the equalizers 430.

As an example, the first optical signal $\lambda_1$ may be close to the best response frequency of the MMF 414. Accordingly, an initial set of tap coefficients may be determined for a first equalizer 430A, a second equalizer 430B, and a third equalizer 430C from the sets of predetermined tap coefficients 120. After the initial set of tap coefficients are determined and input, the first equalizer 430A, the second equalizer 430B, and the third equalizer 430C may perform further adaptation in normal operation.

A fourth equalizer 430D may input several sets of the predetermined tap coefficients 120, all of which result in data signals having an unacceptable quality (e.g., a closed eye). In response, the EOM 170 or another system or processor may read the initial set of tap coefficients or a current set of tap coefficients from the third equalizer 430C. The current set of tap coefficients of the third equalizer 430C may have been successfully learned in decision directed mode by the third equalizer 430C to be optimum for the MMF response at $\lambda_3$. The current set of tap coefficients of the third equalizer 430C may be more optimum than any of the sets of predetermined tap coefficients 120. The tap coefficients read from the third equalizer 430C may be input to the fourth equalizer 430D as an initial set of tap coefficients. The fourth equalizer 430D may then switch to a normal operating mode or decision directed mode based. The EOM 170 may cease operation.

In some embodiments, the receiver assembly 416 of FIG. 4 may include an evaluation module 122 of FIG. 1 other than the EOM 170, that determines a best coefficient signal and/or whether to share a set of tap coefficients. These determinations may be based on another metric indicative of signal quality. For example, in these embodiments, an evaluation module may base such a determination on a derived signal-to-noise ratio, pseudo error, actual received error, statistical analysis of unretimed signal waveforms, etc.

Figure 5A:
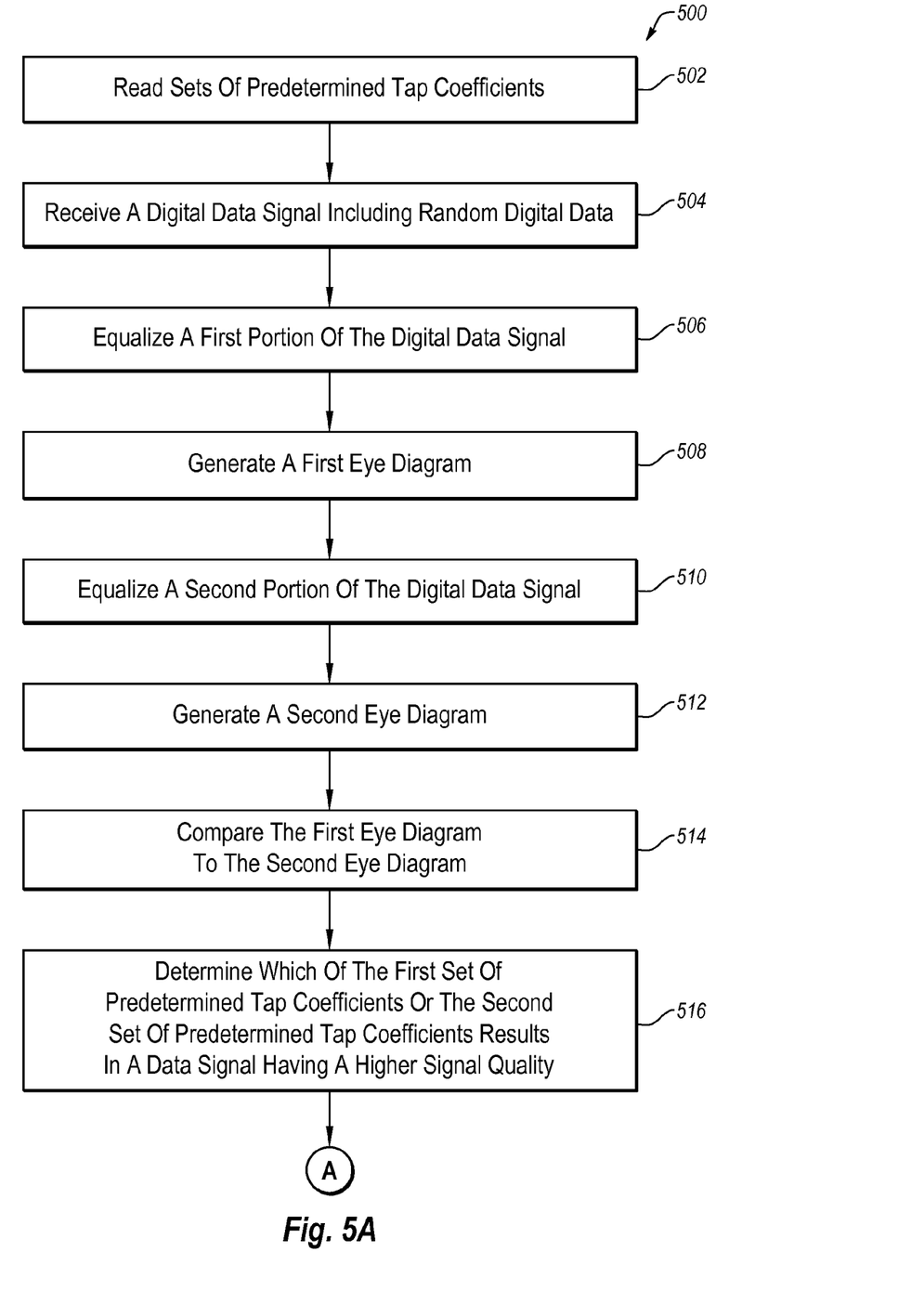
FIGS. 5A and 5B are a flowchart of an example method of blind equalization tap coefficient adaptation.
Figure 5B:
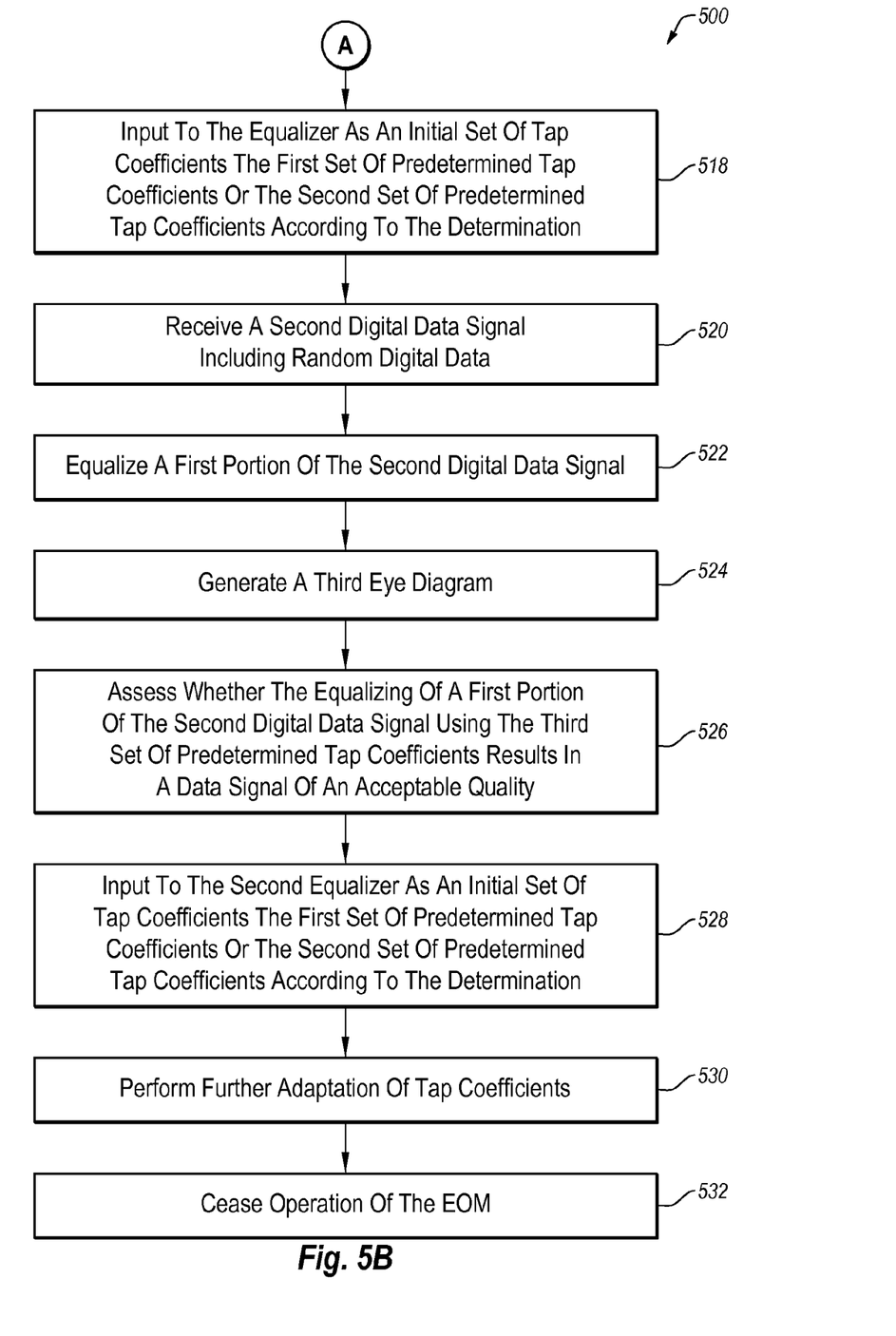

FIGS. 5A and 5B are a flowchart of an example method 500 of blind tap coefficient adaptation in an optical system, arranged in accordance with at least one embodiment described herein. The method 500 may be programmably performed in some embodiments by the receiver assembly 124 described with reference to FIG. 1 and/or the receiver assembly 416 of FIG. 4, for example. In some embodiments, the receiver assembly 124 and/or the receiver assembly 416 may include or may be communicatively coupled to a non-transitory computer-readable medium (e.g., the memory 116 of FIGS. 1 and 4) having stored thereon programming code or instructions that are executable by a computing device to cause the computing device to perform the method 500. Additionally or alternatively, the receiver assembly 124 and/or the receiver assembly 416 may include a processor that is configured to execute computer instructions to cause the receiver assembly 124 and/or the receiver assembly 416 to perform or control performance of the method 500. The processor may include, but is not limited to, a processor, a microprocessor ($\mu$P), a controller, a microcontroller ($\mu$C), a central processing unit (CPU), a digital signal processor (DSP), any combination thereof, or other suitable processor. Although illustrated as discrete blocks, various blocks may be divided into additional blocks, combined into fewer blocks, or eliminated, depending on the desired implementation.

The method 500 may begin at block 502. At block 502, sets of predetermined tap coefficients may be read. For example, a first set of predetermined tap coefficients, a second set of predetermined tap coefficients, a third set of predetermined tap coefficients, or some combination thereof may be read or otherwise accessed from a library stored in a memory included in a receiver assembly. In some embodiments, one or more of the sets of predetermined tap coefficients may be experimentally determined for an optical system. For example, the sets of predetermined tap coefficients may be based on a channel type and/or a characteristic of the optical system.

At block 504, a digital data signal including random digital data may be received. In some embodiments, the digital data signal may include a first digital data signal. The digital data signal may be representative of a first optical signal having a first wavelength.

At block 506, a first portion of the digital data signal may be equalized. The first portion of the digital data signal may be equalized using the first set of predetermined tap coefficients at an equalizer. The equalizer may include a DFE, a FFE, a slicer, and a DD-LMS module. In some embodiments, the equalizer may include a first equalizer of two or more equalizers. In these and other embodiments, the tap coefficients may include one or more coefficients input into multiplication stages of the FFE and one or more coefficients input into multipliers of the DFE.

At block 508, a first eye diagram may be generated. The first eye diagram may be generated from a first portion of an equalized signal output from the equalizer. In some embodiments, the first eye diagram may be generated by an EOM, which may be included in the receiver assembly.

At block 510, a second portion of the digital data signal may be equalized. The second portion of the digital data signal may be equalized using a second set of predetermined tap coefficients at the equalizer.

At block 512, a second eye diagram may be generated. The second eye diagram may be generated from a second portion of an equalized signal output from the equalizer. The second eye diagram may be generated by the EOM.

At block 514, the first eye diagram may be compared with the second eye diagram. At block 516, based on the comparison, it may be determined which of the first set of predetermined tap coefficients or the second set of predetermined tap coefficients results in a data signal having a higher signal quality.

With reference to FIG. 5B, at block 518, the first set of predetermined tap coefficients or the second set of predetermined tap coefficients may be input to the equalizer as an initial set of tap coefficients, according to the determination. In particular, if the first set of predetermined tap coefficients result in data signal having a higher quality (e.g., more open eye) than a data signal generated using the second set of predetermined tap coefficients, the first set of predetermined tap coefficients may be implemented at the equalizer as the initial set of tap coefficients. At block 520, a second digital data signal may be received including random digital data. The second digital data may be representative of a second optical signal having a second wavelength.

At block 522, a first portion of the second digital data signal may be equalized. The first portion of the second digital data signal may be equalized using a third set of predetermined tap coefficients at a second equalizer. At block 524, a third eye diagram may be generated. The third eye diagram may be generated from an equalized signal output from the second equalizer.

At block 526, it may be assessed whether the equalizing of a first portion of the second digital data signal using the third set of predetermined tap coefficients results in a data signal of an acceptable quality. An assessment as to whether the equalizing of a first portion of the second digital data signal using the third set of predetermined tap coefficients results in a data signal of an acceptable quality may be based on the third eye diagram.

At block 528, the first set of predetermined tap coefficients or the second set of predetermined tap coefficients may be input to the second equalizer as an initial set of tap coefficients according to the determination. In particular, if the first set of predetermined tap coefficients is implemented at the equalizer as the initial set of tap coefficients, the first set of predetermined tap coefficients may be input to the second equalizer in response to an assessment that the equalizing of a first portion of the second digital data signal using the third set of predetermined tap coefficients results in a data signal of an unacceptable quality.

At block 530, further adaptation of tap coefficients may be performed, for example, using the first equalizer in normal operation and/or using the second equalizer in normal operation. At block 532, operation of the EOM may be ceased, for example, after the initial set of tap equalization coefficients is input to the first equalizer and/or the second equalizer.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, in some embodiments, an evaluation module (e.g., 122 of FIG. 1) other than the EOM may make determinations described above. Additionally or alternatively, the evaluation module may determine whether to share a set of tap coefficients. These determinations may be based on a signal quality metric indicative of signal quality. For example, in these embodiments, an evaluation module may base such determinations on a derived signal-to-noise ratio, pseudo error, actual received error, statistical analysis of unretimed signal waveforms, etc.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of blind tap coefficient adaptation in an optical system, the method comprising:
 receiving a digital data signal including random digital data;
 equalizing a first portion of the digital data signal using a first set of predetermined tap coefficients to generate a first portion of an equalized signal;
 generating a first eye diagram from the first portion of the equalized signal output from an equalizer;
 equalizing a second portion of the digital data signal using a second set of predetermined tap coefficients to generate a second portion of the equalized signal;
 generating a second eye diagram from the second portion of the equalized signal output from the equalizer;
 comparing the first eye diagram with the second eye diagram;
 determining based on the comparison which of the first set of predetermined tap coefficients or the second set of predetermined tap coefficients results in the digital data signal having a higher signal quality; and inputting to the equalizer as an initial set of tap coefficients, the first set of predetermined tap coefficients or the second set of predetermined tap coefficients according to the determination.

2. The method of claim 1, wherein the generating the first eye diagram and the generating the second eye diagram is performed by an eye opening monitor (EOM), the method further comprising:
performing further adaptation of tap coefficients in the equalizer in a normal operation; and
ceasing operation of the EOM after the initial set of tap equalization coefficients is input to the equalizer.

3. The method of claim 1, wherein the equalizer includes a decision feedback equalizer (DFE), a feed-forward equalizer (FFE), a slicer, and a decision-directed least mean square (DD-LMS) module.

4. The method of claim 1, wherein the tap coefficients include one or more coefficients input into multiplication stages of a feed-forward equalizer (FFE) and one or more coefficients input into multipliers of a decision feedback equalizer (DFE).

5. The method of claim 1, further comprising reading the first set of predetermined tap coefficients and the second set of predetermined tap coefficients from a library stored in a memory included in a receiver assembly.

6. The method of claim 1, wherein the first set of predetermined tap coefficients and the second set of predetermined tap coefficients are experimentally determined for an optical system based on one or more of a channel type and a characteristic of the optical system.

7. The method of claim 1, wherein the digital data signal includes a first digital data signal representative of a first optical signal having a first wavelength and the equalizer includes a first equalizer, the method further comprising:
receiving a second digital data signal including random digital data, the second digital data being representative of a second optical signal having a second wavelength;
at a second equalizer, equalizing a first portion of the second digital data signal using a third set of predetermined tap coefficients to generate a second equalized signal;
generating a third eye diagram from the second equalized signal output from the second equalizer; and
assessing, based on the third eye diagram, whether the equalizing of the first portion of the second digital data signal using the third set of predetermined tap coefficients results in the second digital data signal of an acceptable quality.

8. The method of claim 7, further comprising in response to an assessment that the equalizing of the first portion of the second digital data signal using the third set of predetermined tap coefficients results in the second digital data signal of an unacceptable quality, inputting to the second equalizer as an initial set of tap coefficients the first set of predetermined tap coefficients or the second set of predetermined tap coefficients according to the determination.

9. The method of claim 7, further comprising:
performing further adaptation of tap coefficients using the first equalizer in normal operation and using the second equalizer in normal operation; and
ceasing operation of the eye opening monitor (EOM) after the initial set of tap equalization coefficients are input to the equalizer and to the second equalizer.

10. A receiver assembly configured for blind adaptation of equalizer tap coefficients (tap coefficients), the receiver assembly comprising:
a library on which one or more sets of predetermined tap coefficients are at least temporarily stored;
an equalizer configured to read a first set of predetermined tap coefficients and a second set of predetermined tap coefficients from the library, to equalize a first portion of received digital data using the first set of predetermined tap coefficients, to equalize a second portion of received digital data using the second set of predetermined tap coefficients, and to output an equalized signal; and
an eye opening monitor (EOM) configured to receive the equalized signal from the equalizer; to generate eye diagrams based on a first portion of the equalized signal and a second portion of the equalized signal, to determine based on comparisons of the eye diagrams which of the first and second sets of the predetermined tap coefficients results in the received data signal having a higher signal quality, and to communicate a signal indicating which of the first or the second set of tap coefficients results in the received data signal having the higher signal quality.

11. The receiver assembly of claim 10, wherein the equalizer is further configured to:
receive the signal indicating which of the first or the second set of tap coefficients results in the received data signal having the higher signal quality; and
implement as an initial set of tap coefficients the first set of tap coefficients or the second set of tap coefficients indicated in the signal as resulting in the received data signal having the higher signal quality.

12. The receiver assembly of claim 11, wherein the equalizer is configured to further adapt the tap coefficients based on the initial set of tap coefficients.

13. The receiver assembly of claim 10, wherein the equalizer includes a decision feedback equalizer (DFE), a feed-forward equalizer (FFE), a slicer, and a decision-directed least mean square (DD-LMS) module.

14. The receiver assembly of claim 13, wherein the tap coefficients include one or more coefficients input into multiplication stages of the FFE and one or more coefficients input into multipliers of the DFE.

15. The receiver assembly of claim 10, wherein the EOM is further configured to cease operation following communication of the signal indicating which of the first or the second set of tap coefficients results in the received data signal having the higher signal quality.

16. The receiver assembly of claim 10, wherein the sets of predetermined tap coefficients are experimentally determined for an optical system based on one or more of a channel type and a characteristic of the optical system.

17. The receiver assembly of claim 10, wherein the received data signal includes a first digital data signal representative of a first optical signal having a first wavelength and the equalizer includes a first equalizer, the receiver assembly further comprising:
a second equalizer configured to read a third set of predetermined tap coefficients from the library, to equalize a first portion of a second digital data representative of a second optical signal having a second wavelength using the third set of predetermined tap coefficients, and to output a third equalized signal.

18. The receiver assembly of claim 17, wherein the EOM is further configured to:
generate a third eye diagram based on the third equalized signal output from the second equalizer;
assess based on the third eye diagram whether the equalizing of the first portion of the second digital data signal using the third set of predetermined tap coefficients results in the second digital data signal of an acceptable quality; and in response to an assessment that the equalizing of the first portion of the second digital data signal using the third set of predetermined tap coefficients results in the second digital data signal of an unacceptable quality, communicate a signal to the second equalizer to load the first set of predetermined tap coefficients or the second set of predetermined tap coefficients as a second initial set of tap coefficients.

19. The receiver assembly of claim 18, wherein the EOM is further configured to cease operation following communication of the signal indicating which of the first or the second set of tap coefficients is to be implemented as the initial set of tap coefficients at the second equalizer.

20. A wavelength-division multiplexing optical system including a receiver assembly configured for blind adaptation of equalizer tap coefficients (tap coefficients), wherein the receiver assembly comprises:
- a library on which one or more sets of predetermined tap coefficients are at least temporarily stored;
- an equalizer configured to read a first set of predetermined tap coefficients and a second set of predetermined tap coefficients from the library, to equalize a first portion of received digital data using the first set of predetermined tap coefficients, to equalize a second portion of received digital data using the second set of predetermined tap coefficients, and to output an equalized signal; and
- an eye opening monitor (EOM) configured to receive the equalized signal from the equalizer; to generate eye diagrams based on a first portion of the equalized signal and a second portion of the equalized signal, to determine based on comparisons of the eye diagrams which of the first and second sets of the predetermined tap coefficients results in the received data signal having a higher signal quality, and to communicate a signal indicating which of the first or the second set of tap coefficients results in the received data signal having the higher signal quality.

* * * * *